United States Patent
Heck et al.

(10) Patent No.: US 10,997,296 B2
(45) Date of Patent: May 4, 2021

(54) SYSTEM AND METHOD FOR RESTORATION OF A TRUSTED SYSTEM FIRMWARE STATE

(71) Applicant: Oracle International Corporation, Redwood Shores, CA (US)

(72) Inventors: James A. Heck, Chelmsford, MA (US); Ralph P. Valentino, Stow, MA (US); David W. Hartwell, Lancaster, MA (US)

(73) Assignee: Oracle International Corporation, Redwood Shores, CA (US)

( * ) Notice: Subject to any disclaimer, the term of this patent is extended or adjusted under 35 U.S.C. 154(b) by 153 days.

(21) Appl. No.: 15/466,514

(22) Filed: Mar. 22, 2017

(65) Prior Publication Data
US 2018/0276385 A1  Sep. 27, 2018

(51) Int. Cl.
*G06F 21/57* (2013.01)
*G06F 3/06* (2006.01)
*G06F 21/85* (2013.01)

(52) U.S. Cl.
CPC .......... *G06F 21/572* (2013.01); *G06F 3/0622* (2013.01); *G06F 3/0634* (2013.01); *G06F 3/0656* (2013.01); *G06F 3/0659* (2013.01); *G06F 3/0679* (2013.01); *G06F 21/85* (2013.01)

(58) Field of Classification Search
None
See application file for complete search history.

(56) References Cited

U.S. PATENT DOCUMENTS

| 5,388,267 | A  | * | 2/1995  | Chan     | G06F 9/4403 713/2      |
| 6,662,020 | B1 | * | 12/2003 | Aaro     | G06Q 20/32 455/411     |
| 6,757,838 | B1 | * | 6/2004  | Chaiken  | G06F 9/4403 714/15     |
| 8,495,349 | B2 | * | 7/2013  | Lewis    | G06F 11/1417 713/1     |
| 8,522,309 | B2 |   | 8/2013  | Yoffe et al. |                    |
| 8,924,708 | B2 |   | 12/2014 | Yoffe et al. |                    |
| 9,058,496 | B1 | * | 6/2015  | Dasari   | G06F 21/60             |

(Continued)

FOREIGN PATENT DOCUMENTS

| EP | 0524719 A2 | 1/1993 |
| WO | 2008/083350 A1 | 7/2008 |

*Primary Examiner* — Jaweed A Abbaszadeh
*Assistant Examiner* — Cheri L Harrington
(74) *Attorney, Agent, or Firm* — Invoke (57) ABSTRACT

Operations include restoring a trusted system firmware state. A system stores a set of self-contained secure code in a secure code store. The system stores a set of operational code in an operational code store. The system executes the secure code or the operational code upon system start up, depending whether the system is configured in a secure mode, or in a normal operational mode. When the system is configured in secure mode, the system executes the secure code. In secure mode, the system also overwrites a current version of the operational code stored in the operational code store with a replacement version of the operational code referenced by the secure code. When the system is configured in normal operational mode, the system executes the operational code. During normal operation, the secure code store is electrically isolated.

26 Claims, 4 Drawing Sheets

(56) References Cited

U.S. PATENT DOCUMENTS

| | | | |
|---|---|---|---|
| 9,311,075 B2 * | 4/2016 | Hu | G06F 8/656 |
| 9,930,051 B1 * | 3/2018 | Potlapally | H04L 63/126 |
| 2003/0041248 A1 * | 2/2003 | Weber | G06F 21/575 |
| | | | 713/182 |
| 2003/0076311 A1 * | 4/2003 | Lin | G06F 3/14 |
| | | | 345/204 |
| 2004/0210796 A1 * | 10/2004 | Largman | G06F 11/1417 |
| | | | 714/20 |
| 2004/0268116 A1 * | 12/2004 | Vasisht | G06F 11/1417 |
| | | | 713/100 |
| 2007/0157015 A1 * | 7/2007 | Swanson | G06F 9/4401 |
| | | | 713/2 |
| 2008/0052507 A1 * | 2/2008 | Chow | G06F 21/568 |
| | | | 713/2 |
| 2009/0144472 A1 * | 6/2009 | Montgomery | G06F 21/85 |
| | | | 710/261 |
| 2009/0193150 A1 * | 7/2009 | Graves | G06F 3/0607 |
| | | | 710/3 |
| 2009/0259837 A1 * | 10/2009 | Wu | G06F 11/1456 |
| | | | 713/2 |
| 2012/0079260 A1 * | 3/2012 | Yin | G06F 11/1417 |
| | | | 713/2 |
| 2012/0089870 A1 * | 4/2012 | Chen | G06F 11/1417 |
| | | | 714/30 |
| 2012/0110378 A1 * | 5/2012 | Fan | G06F 11/1658 |
| | | | 714/15 |
| 2012/0265975 A1 * | 10/2012 | Kimelman | G06F 21/53 |
| | | | 713/1 |
| 2013/0031538 A1 * | 1/2013 | Skalsky | G06F 8/654 |
| | | | 717/168 |
| 2013/0047031 A1 * | 2/2013 | Tabone | G06F 11/1417 |
| | | | 714/15 |
| 2013/0173899 A1 * | 7/2013 | Geukes | G06F 21/575 |
| | | | 713/2 |
| 2015/0052616 A1 * | 2/2015 | Hutchison | G06F 21/53 |
| | | | 726/27 |
| 2015/0089209 A1 * | 3/2015 | Jacobs | G06F 21/575 |
| | | | 713/1 |
| 2015/0186150 A1 * | 7/2015 | Chung | G06F 9/4411 |
| | | | 711/103 |
| 2017/0109235 A1 * | 4/2017 | Hung | G06F 11/1417 |
| 2017/0123927 A1 * | 5/2017 | Su | G06F 11/1417 |
| 2017/0139777 A1 * | 5/2017 | Gehrmann | G06F 11/0757 |
| 2018/0039546 A1 * | 2/2018 | Lambert | G06F 11/0793 |
| 2018/0088962 A1 * | 3/2018 | Balakrishnan | G06F 11/1417 |
| 2018/0091315 A1 * | 3/2018 | Singhal | H04L 9/3268 |
| 2018/0096154 A1 * | 4/2018 | Shivanna | G06F 21/575 |
| 2018/0097839 A1 * | 4/2018 | Upasani | G06F 21/57 |
| 2018/0165455 A1 * | 6/2018 | Liguori | G06F 21/575 |
| 2018/0276385 A1 | 9/2018 | Heck et al. | |
| 2018/0285121 A1 * | 10/2018 | Lambert | G06F 9/4405 |

\* cited by examiner

SYSTEM AND METHOD FOR RESTORATION OF A TRUSTED SYSTEM FIRMWARE STATE

TECHNICAL FIELD

The present disclosure relates to computer security. In particular, the present disclosure relates to restoring a trusted system firmware state.

BACKGROUND

Computer systems typically have many components, and many layers of software. Security of computer systems typically takes a layered approach. The first piece of software or firmware, such as a Basic Input/Output System (BIOS) or boot loader, validates the next piece of software before it is loaded, and so forth. A root of trust is a set of hardware or software components that are inherently trusted, and serves as a basis upon which trust in other components can be established. The root of trust is used to establish a chain of trust. Once part of the system has been compromised, the chain of trust is broken. All levels of software are suspect, making it difficult to reestablish a new root of trust to build upon. Typically at the base of such a chain of trust is firmware.

Firmware is software used for control, monitoring, and/or data manipulation. Firmware may be programmed into a computing device. Firmware may be stored in non-volatile memory devices. Firmware typically includes only basic functions of a device. Firmware is often the lowest level of code. Firmware often provides service to higher-level software.

Historically, servers ran on local hardware, and the chain of trust was comparatively easy to establish. Recently, servers have increasingly begun to use a cloud model. In the cloud model, one company may rent out a physical server from another company. This server may have been used by a different customer previously. This creates a new problem, of reestablishing trust in the state of a server with an unknown history.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM IN NORMAL OPERATIONAL MODE
3. SYSTEM IN SECURE MODE
4. RESTORING A TRUSTED SYSTEM FIRMWARE STATE
   A. SYSTEM IS NOT IN SECURE MODE
   B. SYSTEM IS IN SECURE MODE
5. RESTORING A SERVER TO A TRUSTED FIRMWARE STATE
6. REMOTE RECONFIGURATION
7. MISCELLANEOUS; EXTENSIONS
8. HARDWARE OVERVIEW

1. General Overview

One or more embodiments include restoring a trusted system firmware state. The system stores code in two code stores. In a secure code store, the system stores a set of self-contained secure code. The secure code does not reference any other modifiable code. In an operational code store, the system stores a set of operational code.

In an embodiment, the system includes a controller. The controller executes the secure code or the operational code upon system start up, depending on whether the system is in a secure mode or a normal operational mode. When the system is configured in secure mode, the system executes the secure code. In secure mode, the system also overwrites a current version of the operational code stored in the operational code store with a replacement version of the operational code referenced by the secure code.

When the system is configured in normal operational mode, the system executes the operational code. During normal operation, the secure code store is electrically isolated from one or more other components of the system. The secure code cannot be accessed when the system is in normal operational mode.

2. System in Normal Operational Mode

Figure 1A:
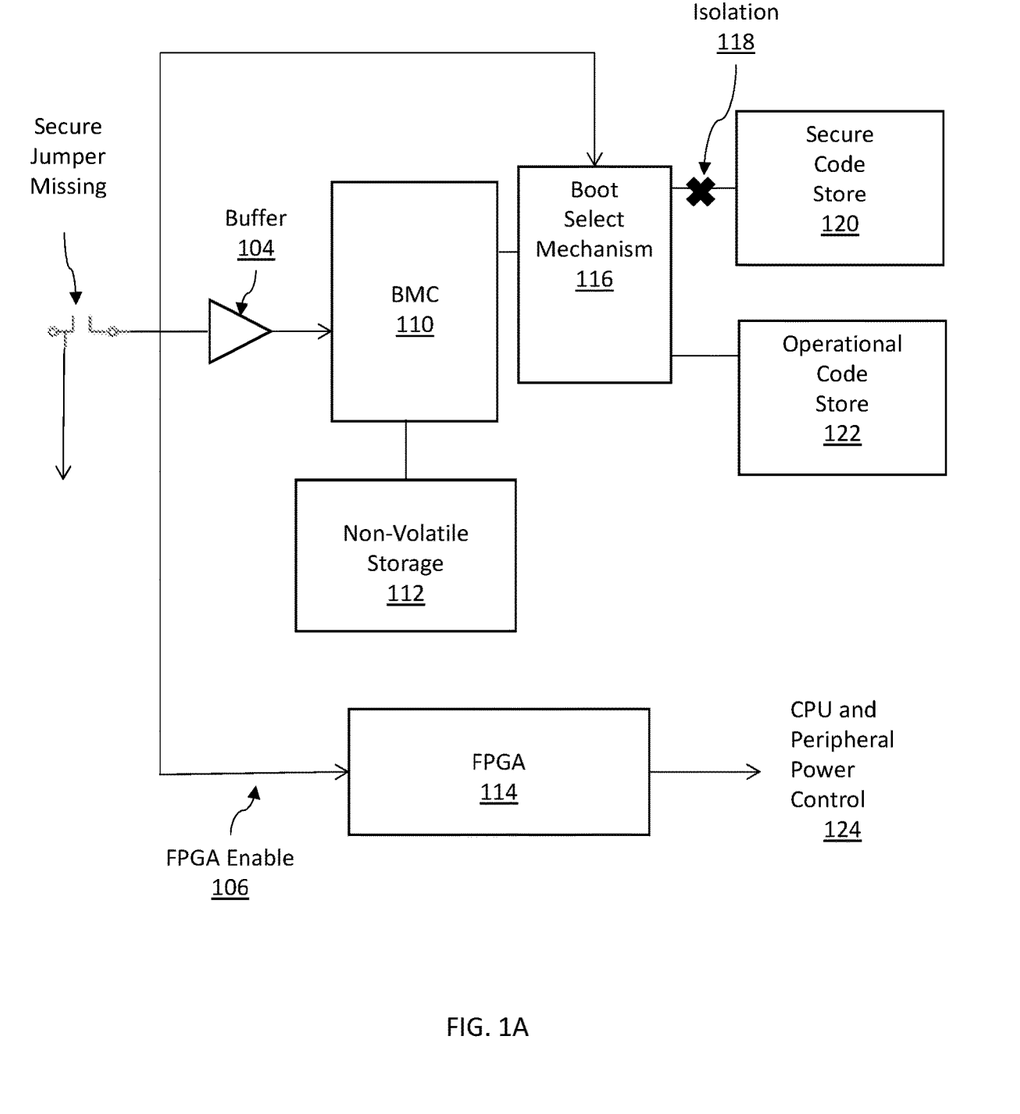
FIG. 1A illustrates a system in normal operational mode, in accordance with one or more embodiments.

FIG. 1A illustrates a system in normal operational mode, in accordance with one or more embodiments. A baseboard management controller (BMC) 110 runs code to control the system. A boot select mechanism 116 selects whether to boot the BMC from code stored in either a secure code store 120, or an operational code store 122. As illustrated in FIG. 1A, the system further includes non-volatile storage 112, a field programmable gate array (FPGA) 114, a buffer 104, and CPU and peripheral power control 124. In one or more embodiments, the system may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In one or more embodiments, the BMC 110 is a controller that manages the system. Software running on the BMC can, among other things, monitor the system, power the system on or off, and install an operating system. The BMC includes software with the ability to determine whether the system is in normal operational mode, or secure mode. The BMC may be configured to fetch code from chip select zero. Chip select zero is a physical pin on the BMC that selects a particular code store. Although a BMC is used in this exemplary embodiment, any type of controller known in the art may be used to perform the same functions. Furthermore, the BMC 110 may be implemented or may execute on the same computing system as the non-volatile storage 112, boot select mechanism 116, FPGA 116, secure code store 120, and operational code store 122. Alternatively or additionally, the BMC 110 may be implemented or executed on a computing system separate from the non-volatile storage 112, boot select mechanism 116, FPGA 116, secure code store 120, and operational code store 122. The BMC 110 may be communicatively coupled to the non-volatile storage or the boot select mechanism via a direct connection or via a network.

In an embodiment, the secure code store 120 is a location in the system where secure code is stored. The secure code store may be, for example, a flash memory, a physical location on a hard drive, or a virtual memory address. The secure code store 120 may include multiple different storage units and/or devices. The multiple different storage units and/or devices may or may not be of the same type or located at the same physical site. In normal operational mode, the secure code store is electrically isolated from the boot select mechanism and the rest of the system (Isolation 118). The secure code, stored in the secure code store, cannot be modified during normal operation. The secure code does not reference any other modifiable code. The secure code store may further store a replacement version of the operational code.

In an embodiment, the operational code store 122 is a location in the system where operational code is stored. The operational code store may be, for example, a flash memory, a physical location on a hard drive, or a virtual memory address. The operational code store 122 may include multiple different storage units and/or devices. The multiple different storage units and/or devices may or may not be of the same type or located at the same physical site. The operational code store is coupled to boot select mechanism 116. The operational code store may be communicatively coupled to the boot select mechanism via a direct connection or via a network. For example, the operational code store may be coupled to the boot select mechanism by a Serial Peripheral Interface bus (SPI). The operational code store is coupled to the boot select mechanism, regardless of whether the system is in secure mode or operational mode. The operational code, stored in the operational code store, is the code used for running the system during normal operation. The operational code may be the lowest level of code on the system.

In an embodiment, the boot select mechanism 116 includes hardware and/or software configured to control the boot device used by the BMC. The BMC may be configured to fetch code from an address mapped to chip select zero, as described above. The boot select mechanism may include functionality to manipulate what is seen by the BMC at chip select zero. The boot select mechanism points chip select zero to either the secure code store or the operational code store, depending on whether the system is in secure mode or operational mode. In operational mode, the secure code store is inaccessible, so the BMC cannot boot from or access the secure code store. In operational mode, the BMC may boot from the operational code store or another store (not shown) that is different from the secure code store.

In an embodiment, the buffer 104 is a one-way buffer coupled between the secure jumper and the BMC. The buffer includes functionality to prevents back-driving. Because the buffer is one-way, signals can only be transmitted to, not from, the BMC along that interface. The buffer 104 may further include functionality to temporarily store data as the data is transmitted to the BMC.

In an embodiment, the non-volatile storage 112 includes functionality to store data used by the system. The non-volatile storage is non-volatile memory, wherein the contents are saved when the system powers off. The non-volatile storage may be, for example read-only memory (ROM), programmable read-only memory (PROM), flash memory, a hard disk drive, or magnetic tape. The non-volatile storage 112 may include multiple different storage units and/or devices. The multiple different storage units and/or devices may or may not be of the same type or located at the same physical site. The non-volatile storage may be communicatively coupled to the BMC via a direct connection or a network.

In an embodiment, the FPGA 114 is an integrated circuit comprising an array of programmable logic blocks. The FPGA includes functionality to control the state of a component such as the CPU, peripheral power, add-in cards, and networks. For instance, the FPGA may control power to a device. The FPGA may be communicatively coupled to the CPU and peripheral power control via a direct connection or via a network.

In an embodiment, the CPU and peripheral power control 124 are communicatively coupled to the FPGA. The CPU is a processing unit used by the system to run software. The CPU may carry out instructions, based on the software. The peripheral power control may control power to the CPU and/or the system at large.

In normal operational mode, a secure jumper is not installed on the motherboard. As a result, two pins, on a motherboard comprised in the system, are electrically isolated. In normal operation, signals are sent to the FPGA, BMC (via buffer 104), and boot select mechanism.

In normal operation, in absence of the secure jumper, the system generates an FPGA enable signal 106. The FPGA enable signal enables the FPGA. When the FPGA enable signal is active, the FPGA is operational. The FPGA may make internal changes to itself. The FPGA may transmit instructions to the CPU and peripheral power control. In normal operational mode, the FPGA may, for example, control power to the CPU.

In absence of the secure jumper, the system also generates a signal to the BMC, so that the BMC may determine that normal operational mode is active. Further, a secure signal is transmitted to the boot select mechanism 116. The secure signal affects the boot selection logic of the boot select mechanism, such that the operational code store 122 is the boot device for the BMC.

In normal operational mode, the secure code store 120 is isolated from the boot select mechanism, and the rest of the system (Isolation 118). The secure code store may be physically isolated, by severing the connection to the boot select mechanism, or by disconnecting power to the secure code store. When the secure code store is isolated, it cannot be accessed by the rest of the system. In normal operational mode, the secure code store cannot be modified.

The system may further comprise one or more operating systems, BIOS code sets, and applications (not pictured).

3. System in Secure Mode

Figure 1B:
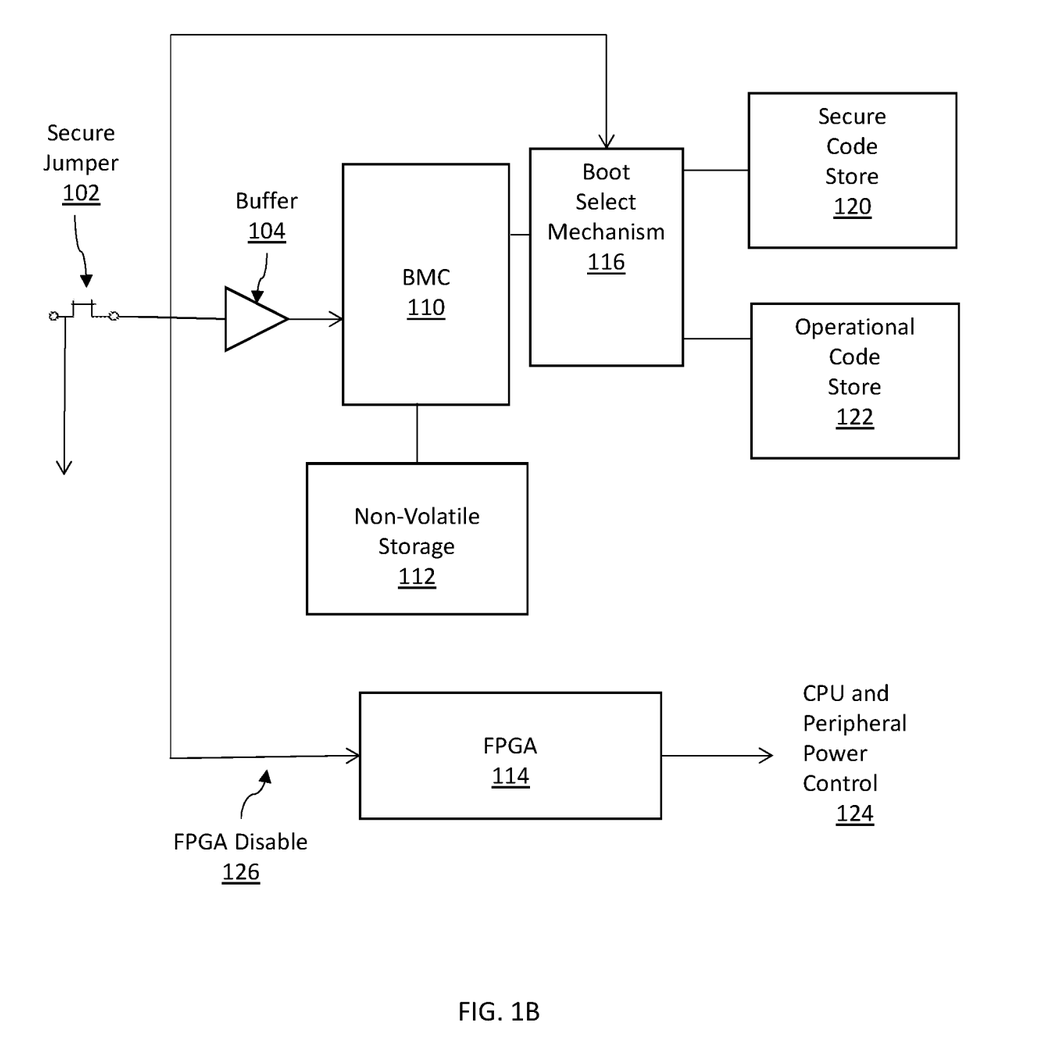
FIG. 1B illustrates a system in secure mode, in accordance with one or more embodiments.

FIG. 1B illustrates a system in secure mode, in accordance with one or more embodiments. The BMC 110, buffer 104, non-volatile storage 112, boot select mechanism 116, secure code store 120, operational code store 122, FPGA 114, and CPU and peripheral power control 124 are described above in Section 2 with reference to FIG. 1A, however, these components may be implemented or operate differently as noted below. In FIG. 1B, the system is in the secure state as a result of the secure jumper 102 being inserted. In one or more embodiments, the system may include more or fewer components than the components illustrated in FIG. 1B. The components illustrated in FIG. 1B may be local to or remote from each other. The components illustrated in FIG. 1B may be implemented in software and/or hardware. Each component may be distributed over multiple applications and/or machines. Multiple components may be combined into one application and/or machine. Operations described with respect to one component may instead be performed by another component.

In an embodiment, the secure jumper 102 is a physical shorting device that can be placed between two pins on a motherboard of the system. The secure jumper is grounded on one side. On the other side, the secure jumper is coupled to the BMC 110 via buffer 104. When the secure jumper is inserted, the secure jumper connects the two pins electrically, changing the configuration of the system motherboard. When the secure jumper is in place, the circuit connected to the BMC is configured to transmit the secure signal.

The placement of the secure jumper changes the chip select hardware logic on the board, to change the boot device of the BMC via the boot select mechanism 116. The secure jumper triggers hardware on the motherboard, reconfiguring the code store attached to the service processor, and effectively changing the boot device. Additionally, when the secure jumper 102 is inserted, a secure signal is asserted. The secure signal is transmitted to the FPGA, the BMC (via buffer 104), and the boot select mechanism. With the secure jumper installed, the system is in secure mode.

The secure signal, transmitted to the FPGA, triggers an FPGA disable signal (126). The FPGA disable signal transmits an instruction to the FPGA, disabling the entire FPGA. The FPGA disable signal prevents the FPGA from running or communicating with any other devices. The FPGA disable signal secures the system from being interfered with by an untrusted entity within the FPGA while the system is in secure mode. The FPGA cannot cause any interference with the process of restoring a trusted firmware state.

In an embodiment, the FPGA is connected to the CPU and peripheral power control 124. When the FPGA is disabled, the CPU and peripheral power control are in turn disabled, as they only can function through communication with the FPGA. In secure mode, the CPU and peripheral power control are disabled and logically isolated from the rest of the system.

The secure signal further causes the secure code store to be connected to the BMC, by disabling the isolation. The BMC 110 may be communicatively coupled to the non-volatile storage or the boot select mechanism via a direct connection or via a network. For example, the secure code store may be coupled to the boot select mechanism by a Serial Peripheral Interface bus (SPI). The secure signal affects the boot selection logic, such that the secure code store becomes the boot device for the BMC. The operational code store becomes, in effect, a secondary storage device. The system can only be reconfigured to or from secure mode by physically manipulating the system, by inserting or removing the secure jumper. The system cannot be reconfigured to or from secure mode by the execution of any code.

As mentioned above, the boot select mechanism points chip select zero to either the secure code store or the operational code store, depending on whether the system is in secure mode or operational mode. In secure mode, when both the secure code store and the operational code store are connected to the boot select mechanism, the boot select mechanism is configured to boot from the secure code.

4. Restoring a Trusted System Firmware State

Figure 2:
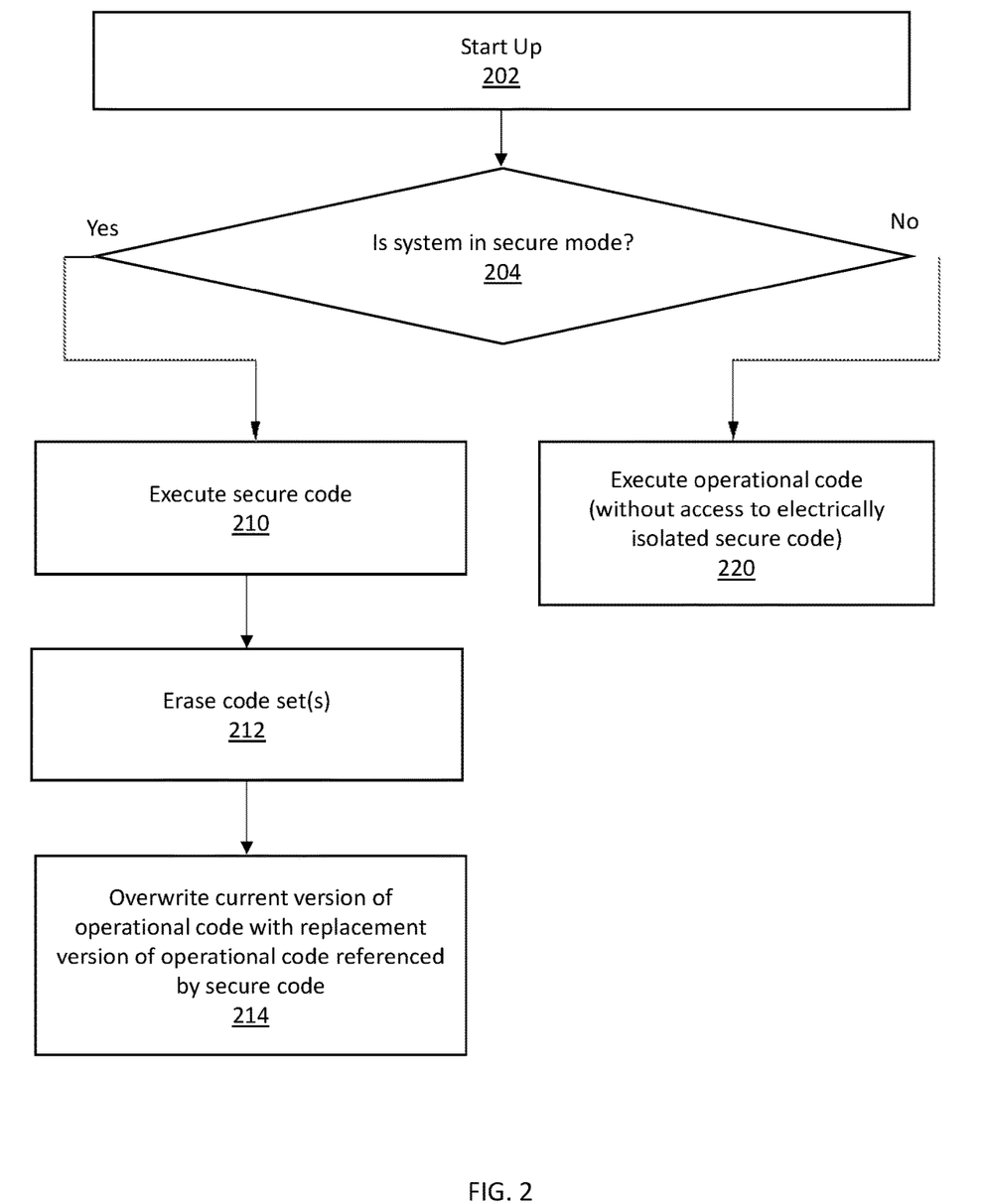
FIG. 2 illustrates an example set of operations for restoration of a trusted system firmware state in accordance with one or more embodiments.

FIG. 2 illustrates an exemplary set of operations for restoring a trusted firmware state, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

First, the system starts up (Operation 202). System start up may include powering on one or more devices of the system. System start up may include booting one or more devices, based on software. The controller (e.g., a BMC) boots, based on the code stored in the selected code store.

The selected code store is based upon the hardware configuration of the system. The system is either in secure mode, or not in secure mode (Operation 204). Whether the system is in secure mode is a matter of hardware logic, as determined by whether the secure jumper is inserted connecting two pins on the motherboard. Alternatively or additionally, the system may be configured to or from secure mode remotely, as described below in Section 6. As a result of the hardware logic, the system transmits one or more signals. Based on the signals, system components can determine the mode in effect.

A. System is not in Secure Mode

If the system is not in secure mode, then the controller executes the operational code, without access to the electrically-isolated secure code (Operation 220). Executing the operational code may include retrieving the operational code from the operational code store. The controller may retrieve the operational code from the operational code store physically, e.g., via a bus, or over a secure network. Executing the operational code may further include interpreting the operational code. Based on instructions in the operational code, the controller may perform a sequence of actions. For example, the controller may monitor the temperature of a processing unit of the system, based on instructions retrieved from the operational code store.

The controller boots from the operational code store in normal operational mode. In absence of the secure jumper, the secure code is electrically isolated. Electrical isolation of the secure code may be achieved by physically severing the connection between the secure code store and the boot select mechanism. For example, the absence of the secure jumper disconnects a wire connecting the secure code store and the boot select mechanism.

In absence of the secure jumper, the hardware logic of the boot select mechanism is configured to select the operational code store as the boot device for the controller. The boot select mechanism may transmit boot device information to the controller, by transmitting an instruction that the operational code store is at chip select zero. The controller is configured to boot from chip select zero. The controller therefore boots from the operational code store, when not in secure mode.

Additionally, a signal sent to the controller from the motherboard, in absence of the secure jumper, is received by the controller as an input signal. This input signal allows the controller logic to determine that it is not operating in secure mode.

B. System is in Secure Mode

If the system is in secure mode, then the controller executes the secure code (Operation 210). Executing the secure code may include retrieving the secure code from the secure code store. The controller may retrieve the secure code from the secure code store physically, via a bus, or over a secure network. Executing the secure code may further include interpreting the secure code. Based on instructions in the secure code, the controller may perform a sequence of actions. For example, the controller may erase the software and/or memory stored to a particular device, based on instructions in the secure code.

With the secure jumper inserted into the motherboard, the motherboard is configured to transmit a secure signal. The secure signal is sent to the boot select mechanism, the controller, and the FPGA.

The secure signal, sent to the boot select mechanism, affects the boot selection logic. The secure signal causes the secure code store to be coupled to the boot select mechanism, and no longer disabled. The secure code is no longer isolated from the controller.

Further, when the secure jumper is inserted, the hardware logic of the boot select mechanism is configured to select the secure code store as the boot device for the controller. The boot select mechanism configures the system to boot from the secure code store. Although both the secure code store and the operational code store are connected to the boot select mechanism in secure mode, the boot select mechanism instructs the controller to boot from the secure code store. The boot select mechanism may transmit boot selection information to the controller. The boot select mechanism may transmit a notification to the controller that the secure code store is at chip select zero. The controller is configured to always boot from chip select zero. The controller therefore boots from the secure code store, when in secure mode.

The system also transmits a secure signal to the controller. The controller receives the secure signal, as an input signal which cannot be back-driven. The placement of the buffer along the interface between the secure jumper and the controller prevents the controller from sending signals back towards the secure jumper. The controller cannot modify the secure signal. Due to receipt of the secure signal, the controller logic knows that it is operating in secure mode.

Additionally, the system transmits an FPGA disable signal to the FPGA. The FPGA disable signal prevents operation of the FPGA. The FPGA disable signal may cause the FPGA to be disabled, by cutting off power or clocks to the FPGA. The FPGA disable signal may cause the FPGA to be disabled by isolating the FPGA from other devices. When disabled, the FPGA cannot affect the state of any devices of the system. The FPGA cannot cause any interference with the process of restoring a trusted firmware state.

In secure mode, the controller erases one or more code sets (Operation 212). The controller transmits an instruction to all devices that are not trusted, to erase the code and/or memory stored therein. The controller causes all programmable memory to be erased, which may include code sets stored to a peripheral service processor, NAND flash, non-volatile storage, or an FPGA. The controller may erase code sets such an operating system and/or a BIOS code set.

Next, the controller overwrites the current version of the operational code with a replacement version of the operational code referenced by the secure code (Operation 214). The secure code may include instructions to replace the operational code set with a version of the original operational code set that has been kept segregated in the secure code store. Alternatively, the operational code set may be replaced with a part of the original operational code set. The operational code set may be replaced with a boot loader. The steps described above can be executed without the need for any other firmware. Once the operations are complete, the entire system is cleaned and restored to a trusted firmware state.

For example, a user powers on the system with the secure jumper in place. The system is in secure mode. In secure mode, an FPGA disable signal is sent to the FPGA, disabling the FPGA, CPU, and peripheral power control.

The system also transmits a secure signal to the boot select mechanism, causing it to disable the isolation of the secure code store. The secure signal affects the boot selection logic, in the boot select mechanism. In secure mode, the secure code store becomes the boot device for the controller.

The system also transmits a secure signal to the controller. The controller receives the secure signal, as an input signal which cannot be back-driven. Due to receipt of the secure signal, the controller logic knows that it is operating in secure mode.

The secure code store contains code instructing the controller to erase the code sets on the non-volatile storage, FPGA, and the operational code store. The secure code store further contains code that instructs the system to replace the code in the operational code store with a clean version of the operational code. After operating for a period of time, the operational code, in the operational code store, may have been altered, and possibly compromised. The controller, in response to the instructions from the secure code, erases and replaces the codes.

At this point, the operational code store contains clean code, but the code on the non-volatile storage and FPGA have not been replaced. To replace the code on these devices, a user reconfigures the system to normal operational mode. The operator physically removes the secure jumper. Removal of the secure jumper reconfigures the connection on the motherboard.

The boot select hardware logic has been reconfigured to isolate the secure code store. The system transmits signals to the controller and the boot select mechanism, so that the controller boots from the operational code in the operational code store. The system transmits an FPGA enable signal to the FPGA. The FPGA is enabled, responsive to receipt of the FPGA enable signal.

Now, the operational code store is connected to the controller and the secure code store is not connected to the controller. The controller boots from the operational code in the operational code store. The secure code store is isolated from the system and cannot be compromised.

5. Restoring a Server to a Trusted Firmware State

As an example, the system executes operations to restore a server to a trusted firmware state. First, an operator powers off the system and inserts the secure jumper. The operator turns the power on, causing the BMC to boot.

The BMC recognizes that the BMC is in secure mode, and boots from the secure code store. The BMC disables input from all external interfaces, and disables one or more devices of the system. The BMC may disable all untrusted devices and/or all devices that are not necessary for the execution of the secure code. The BMC may erase all non-volatile storage that it has access to, including the operational code store, the motherboard FPGA, non-volatile memory (e.g., NAND), and any other writable stores. The BMC reconstructs the operational code store using the contents of the secure code store.

During this process, the BMC displays its status. In secure mode, the system will not boot all the way to the operating system. The BMC signals this by blinking an LED until all steps in secure mode are completed. Once the steps in secure mode have been completed, the BMC signals that the server has been restored to a trusted state, by altering the LED and displaying a message on a serial console.

The operator turns the power off, and removes the jumper. When the system is powered on without the jumper in place, the system sends enable signals instead of disable signals. Transmission of the enable signals causes the boot select mechanism to isolate and protect the secure code store, and configure the operational code store as the boot device.

The BMC boots from the new, trusted code in the operational code store. The BMC loads a fresh firmware image. The fresh firmware image can be loaded from any trusted source, such as from a web server via network connection, or through a DVD. The BMC re-installs known good copies of all remaining firmware, such as BIOS, FPGA, and non-volatile memory. This can be done through normal firmware update procedure. The system is back in an operational state, and can operate from the newly restored root of trust.

6. Remote Reconfiguration

In an embodiment, the system can be configured to and from secure mode remotely. The secure signal need not be asserted with a jumper. In this case, the secure signal is asserted using a trusted entity in the system, which allows remote administration of the system.

To prevent unauthorized remote reconfiguration, the system includes a trusted entity. The trusted entity may be, for example, an add-in card with its own private interfaces. The trusted card is isolated from the rest of the system, and remains under control only by trusted users or devices. The trusted card may run on a simple microcontroller, to make it easy to verify that it is in a trusted state. The trusted entity manipulates signals in the system independently of the security model of the system. For example, the trusted entity can manipulate the secure signal, or the trusted entity can manipulate power to the system.

The trusted entity is connected to the system logic, in place of the secure jumper. The trusted entity can receive an instruction from an external source. The trusted entity may then control the transmission of the secure signal, as described above.

In an embodiment, the trusted entity is communicatively coupled to a remote interface via a trusted remote connection. The trusted remote connection is private to any other interface connected to the system. The trusted remote connection may be a serial interface, and/or a network connection that only connects to a private network. By using the remote interface, an authorized user may alter the hardware configuration to or from secure mode.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 3:
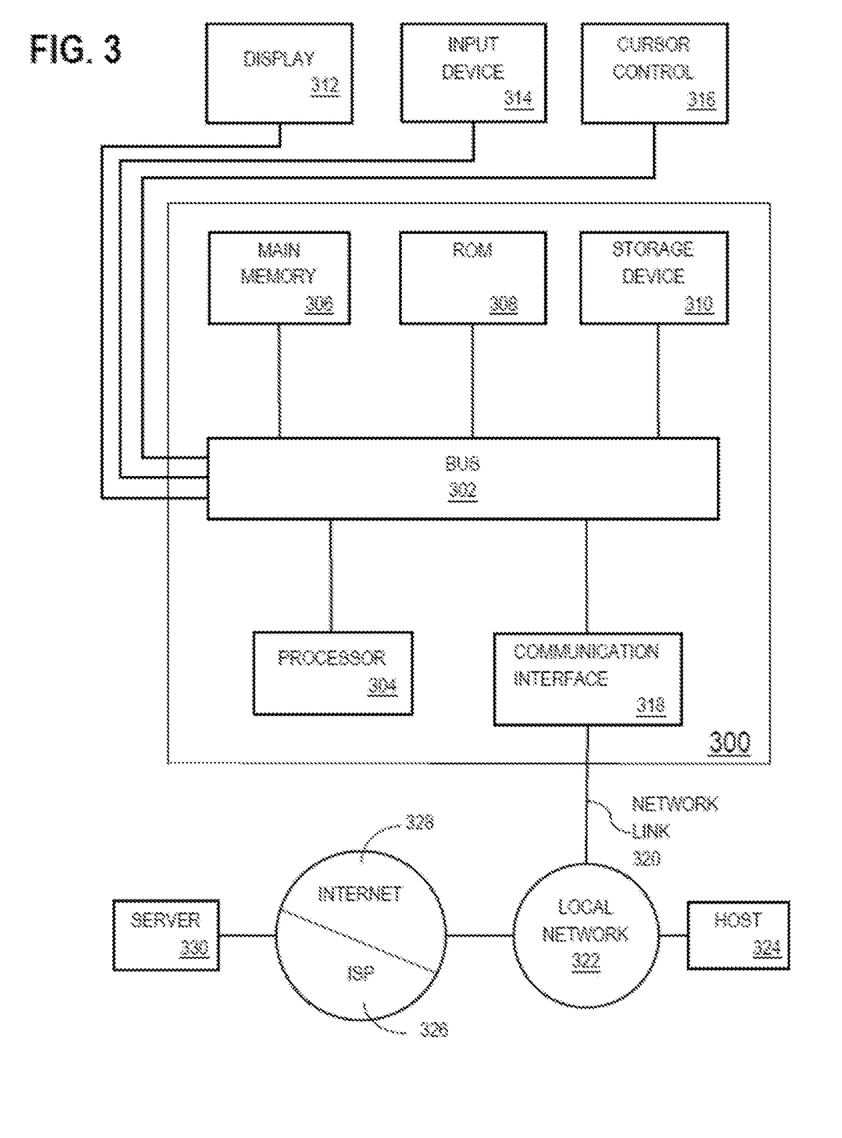
FIG. 3 illustrates a block diagram of a system in accordance with one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 310. Volatile media include dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   a secure code store comprising a set of secure code;
   an operational code store comprising a set of operational code;
   a controller including functionality to initially execute, upon system start-up, only one of:
   (a) the set of secure code when the system is configured with a first hardware configuration, wherein:
   execution of the set of secure code comprises overwriting a current version of the set of operational code stored in the operational code store with a replacement version of the set of operational code referenced by the secure code;
   an integrated circuit in communication with the controller that is not needed for the execution of the secure code is disabled during execution of the set of secure code;
   the integrated circuit is in communication with a peripheral power control sub-system and a central processing unit (CPU) in addition to being in communication with the controller;
   disabling the integrated circuit disables the peripheral power control sub-system, thereby depriving the CPU of power during execution of the secure code; and
   (b) the set of operational code when the system is configured with a second hardware configuration, wherein the secure code store is electrically isolated from one or more other components of the system when the system is configured with the second hardware configuration, wherein the set of secure code cannot be accessed when the system is configured with the second hardware configuration.

2. The system of claim 1, wherein the execution of the set of secure code further comprises erasing a code set corresponding to one or more of:
an operating system;
a BIOS code set;
an application;
a NAND flash;
non-volatile storage; and
a programmable logic device.

3. The system of claim 1, wherein the replacement version of the operational code referenced by the set of secure code is stored within the secure code store.

4. The system of claim 1, wherein the replacement version of the operational code referenced by the set of secure code is stored external to the secure code store.

5. The system of claim 1, wherein a change between the first hardware configuration and the second hardware configuration cannot be effected without a physical manipulation of the system.

6. The system of claim 5, wherein the physical manipulation of the system comprises: (a) adding a jumper to connect two pins on a motherboard comprised in the system or (b) removing the jumper to disconnect two pins on the motherboard comprised in the system.

7. The system of claim 1, wherein a change between the first hardware configuration and the second hardware configuration can be effected by a trusted entity communicatively coupled via a trusted remote connection to the system.

8. The system of claim 1, wherein a change from the second hardware configuration to the first hardware configuration cannot be effected by execution of any code.

9. The system of claim 1, wherein the disabled integrated circuit comprises a field programmable gate array (FPGA).

10. The system of claim 1, wherein the first hardware configuration disables one or more devices that include functionality to interfere with a secure recovery of the system enabled by the secure code.

11. The system of claim 1, wherein disabling the integrated circuit prevents communication (1) to and from the integrated circuit and (2) to and from the central processing unit (CPU) during execution of the secure code.

12. A method comprising:
storing, in a secure code store, a set of secure code;
storing, in an operational code store, a set of operational code;
executing with a controller, upon system start-up, only one of:
(a) the set of secure code when the system is configured with a first hardware configuration, wherein:
execution of the set of secure code comprises overwriting a current version of the set of operational code stored in the operational code store with a replacement version of the set of operational code referenced by the secure code;
an integrated circuit in communication with the controller that is not needed for the execution of the secure code is disabled during execution of the set of secure code;
the integrated circuit is in communication with a peripheral power control sub-system and a central processing unit (CPU) in addition to being in communication with the controller;
disabling the integrated circuit disables the peripheral power control sub-system, thereby depriving the CPU of power during execution of the secure code; and (b) the set of operational code when the system is configured with a second hardware configuration, wherein the secure code store is electrically isolated from one or more other components of the system when the system is configured with the second hardware configuration, wherein the set of secure code cannot be accessed when the system is configured with the second hardware configuration;
wherein the method is performed by at least one device including a hardware processor.

13. The method of claim 12, wherein the execution of the set of secure code further comprises erasing a code set corresponding to one or more of:
an operating system;
a BIOS code set;
an application;
a NAND flash;
non-volatile storage; and
a programmable logic device.

14. The method of claim 12, wherein the replacement version of the operational code referenced by the set of secure code is stored within the secure code store.

15. The method of claim 12, wherein the replacement version of the operational code referenced by the set of secure code is stored external to the secure code.

16. The method of claim 12, wherein a change between the first hardware configuration and the second hardware configuration cannot be effected without a physical manipulation of the system.

17. The method of claim 16, wherein the physical manipulation of the system comprises: (a) adding a jumper to connect two pins on a motherboard comprised in the system or (b) removing the jumper to disconnect two pins on the motherboard comprised in the system.

18. The method of claim 12, wherein a change between the first hardware configuration and the second hardware configuration can be effected by a trusted entity communicatively coupled via a trusted remote connection to the system.

19. The method of claim 12, wherein a change from the second hardware configuration to the first hardware configuration cannot be effected by execution of any code.

20. The method of claim 12, wherein disabled integrated circuit comprises a field programmable gate array (FPGA).

21. The method of claim 12, wherein the first hardware configuration disables one or more devices that include functionality to interfere with a secure recovery of the system enabled by the secure code.

22. A non-transitory computer readable medium comprising instructions which, when executed by one or more hardware processors, causes performance of operations comprising:
storing, in a secure code store, a set of secure code;
storing, in an operational code store, a set of operational code;
executing with a controller, upon system start-up, only one of:
(a) the set of secure code when the system is configured with a first hardware configuration, wherein:
execution of the set of secure code comprises overwriting a current version of the set of operational code stored in the operational code store with a replacement version of the set of operational code referenced by the secure code;

an integrated circuit in communication with the controller that is not needed for the execution of the secure code is disabled during execution of the set of secure code;

the integrated circuit is in communication with a peripheral power control sub-system and a central processing unit (CPU) in addition to being in communication with the controller;

disabling the integrated circuit disables the peripheral power control sub-system, thereby depriving the CPU of power during execution of the secure code; and (b) the set of operational code when the system is configured with a second hardware configuration, wherein the secure code store is electrically isolated from one or more other components of the system when the system is configured with the second hardware configuration, wherein the set of secure code cannot be accessed when the system is configured with the second hardware configuration.

23. The system of claim 1, further comprising a buffer connected between the controller and a trusted entity that can effect a change between the first hardware configuration and the second hardware configuration, the buffer preventing the controller from modifying a communication from the trusted entity.

24. The system of claim 1, wherein disabling the integrated circuit secures the system from being interfered with by an untrusted entity.

25. The system of claim 24, wherein the untrusted entity is stored within or executed by the integrated circuit.

26. The system of claim 1, wherein in the first hardware configuration, the controller transmits an instruction to an untrusted device to erase the code and/or memory stored on the untrusted device.

* * * * *